Figure 1A:
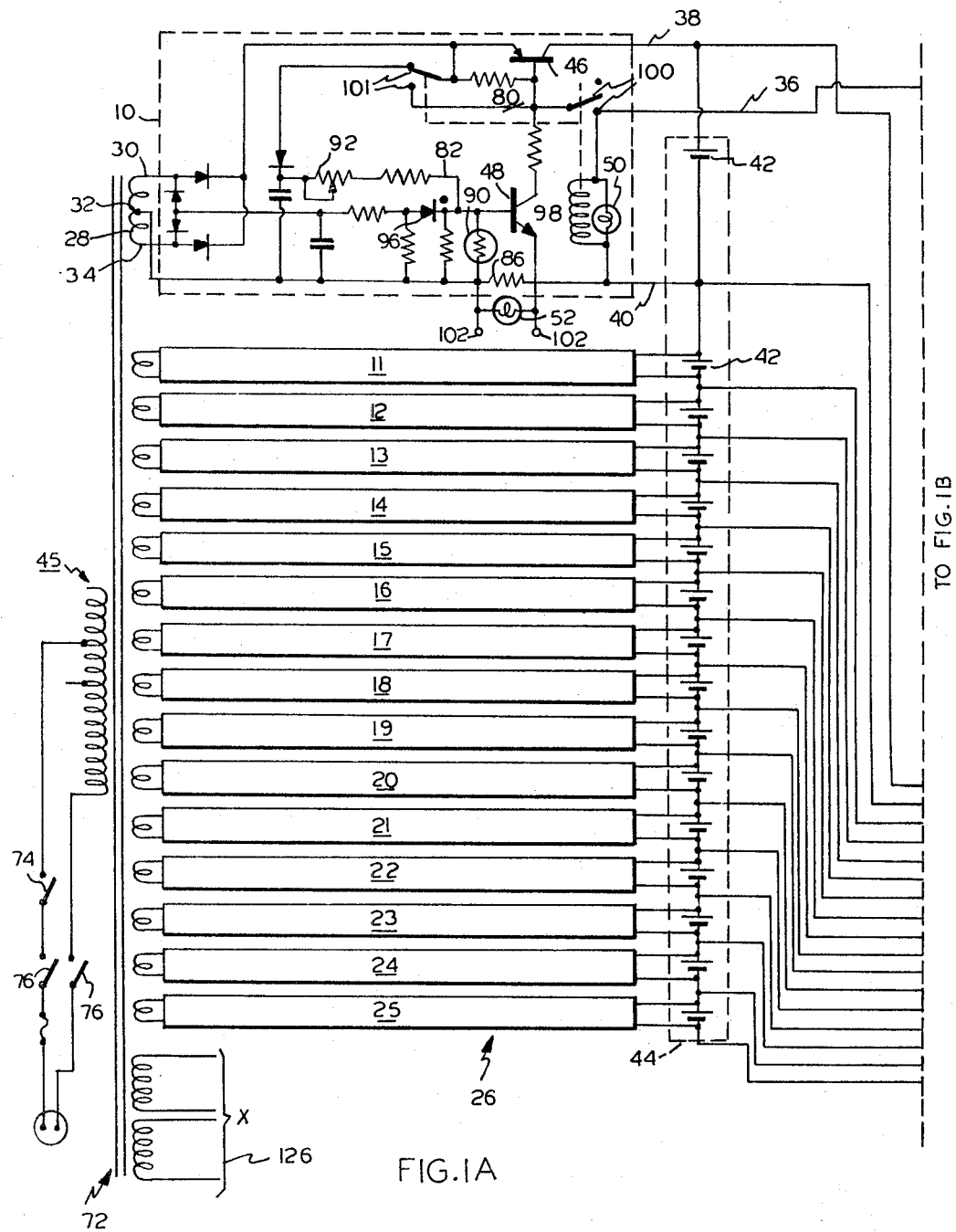

Feb. 21, 1967  R. W. OAKS ET AL  3,305,754
CHARGING APPARATUS FOR MULTICELL BATTERIES
Filed June 4, 1963  3 Sheets-Sheet 1

INVENTORS
RICHARD W. OAKS
PALMER K. WEIR
BY
*Britton Moore*
ATTORNEY

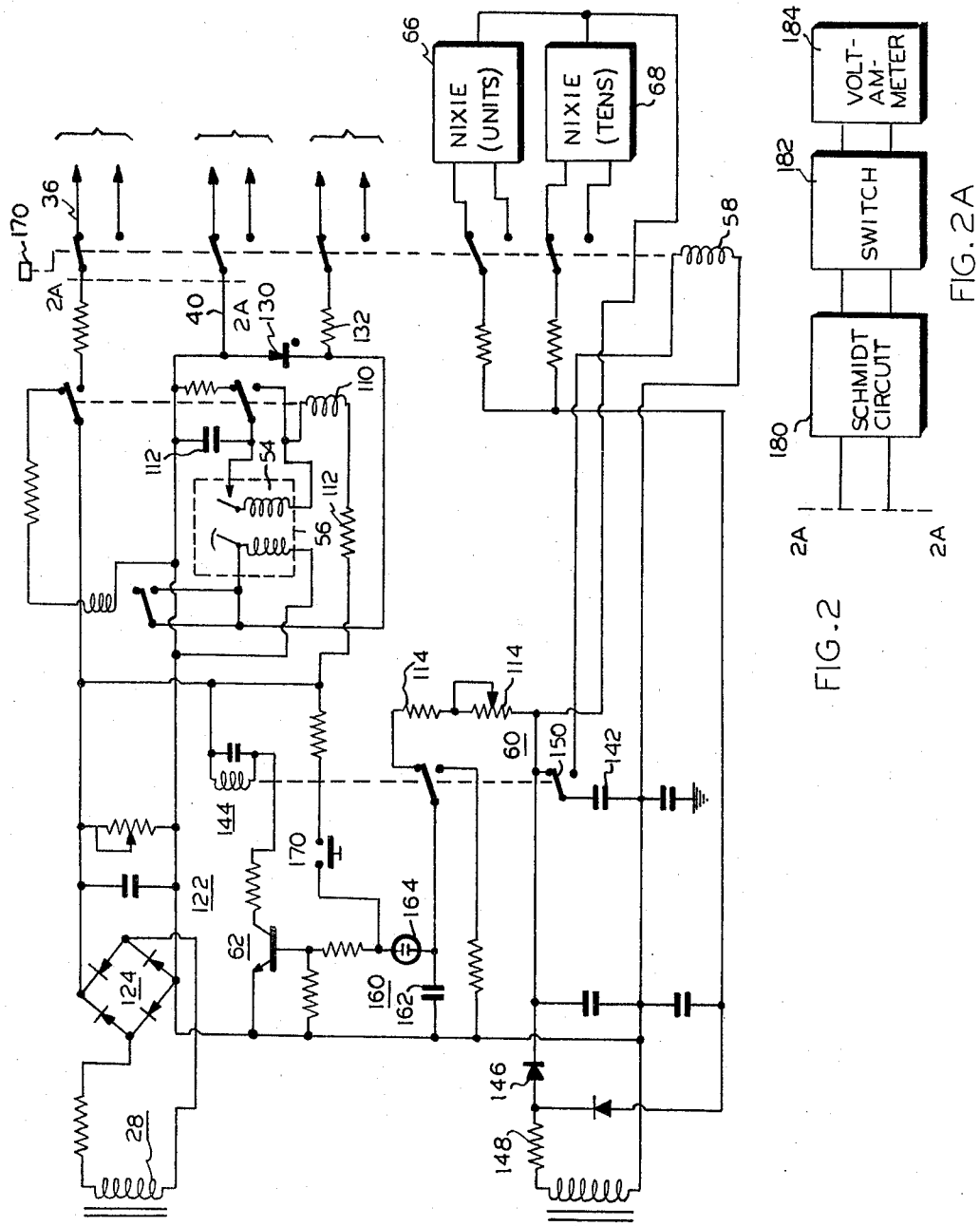

# United States Patent Office 3,305,754
Patented Feb. 21, 1967

3,305,754
CHARGING APPARATUS FOR MULTICELL
BATTERIES
Richard W. Oaks and Palmer K. Weir, Tucson, Ariz., assignors to Frederick Research Corporation
Filed June 4, 1963, Ser. No. 285,414
5 Claims. (Cl. 320—37)

The invention relates to charging circuits for multicell batteries, such as the silver-zinc type batteries, and more particularly it relates to separate secondary charging circuits being individually controlled for coupling each cell of a battery to the charging circuit until the cells of the battery are completely charged.

One of the important features of the invention is that it provides a novel and improved battery charger designed to charge a multicell silver-zinc battery at a high rate without damaging any of the individual cells of the battery. The silver-zinc cell has the property that when the cell becomes fully charged, the internal resistance of the cell increases in value. The application of a high charging current to the cell having a high internal resistance when the cell has reached a maximum charge value causes overheating of the cell resulting in substantial damage to the cell. Since each cell of a multicell battery is not precisely identical in characteristics, a different amount of charge energy must be supplied to each cell to achieve a fully charged battery.

Another feature of the invention is that a battery charger supplies a very high charging current to an initially dead cell of the battery, and the charging current tapers downward in value to approximately 80% of the initial current value as the cell terminal voltage approaches a predetermined value such as 2.1 volts. When the terminal voltage of the cell reaches the predetermined value, charging of the cell automatically is stopped in accordance with the characteristics of the control apparatus of the charging circuit and thereby prevents damage to the cell in accordance with a preferred embodiment of the invention. Each cell of the multicell battery receives a charge until the terminal voltage of the cell reaches the predetermined value. After every cell of the battery has been completely charged, the battery is then fully charged in a minimum amount of time without any of the cells of the battery being damaged by excessive currents or heating due to heavy current dissipation. In this manner there is provided a fully charged battery which is charged within a minimum of time and is completely ready for use as desired.

The individual cells of the multicell battery are charged in their normal series configuration, if desired, and require no disassembly or rewiring. The battery charger in accordance with the present invention will accommodate multicell batteries from one, for example, to sixteen cells. Batteries with more than sixteen cells may be charged sixteen cells at a time, or various other arrangements may be made, to provide charging apparatus for any increased number of cells for a short period of time, and more than one charger may be used simultaneously so that each battery charger may accommodate sixteen cells or less at a time.

With the new arrangement it is possible to provide a battery charger capable of providing a tapered current type charge to a cell in which the taper of the current is in accordance with the value of the terminal voltage of the cell, and thus to serially charge independently each cell of a multicell battery. As each cell reaches a predetermined voltage level, the charging is automatically stopped. The complete battery is considered fully charged when all cells reach the predetermined voltage level.

One of the most important applications of the new circuit is to eliminate overcharge and heavy power dissipation in battery cells, such as the silver-zinc type battery, and to allow remaining cells of the battery to become fully charged.

The outstanding advantage of the new circuit resides in providing a circuit arrangement for completely charging each cell of a battery regardless of cell voltage balance.

Figure 1B:
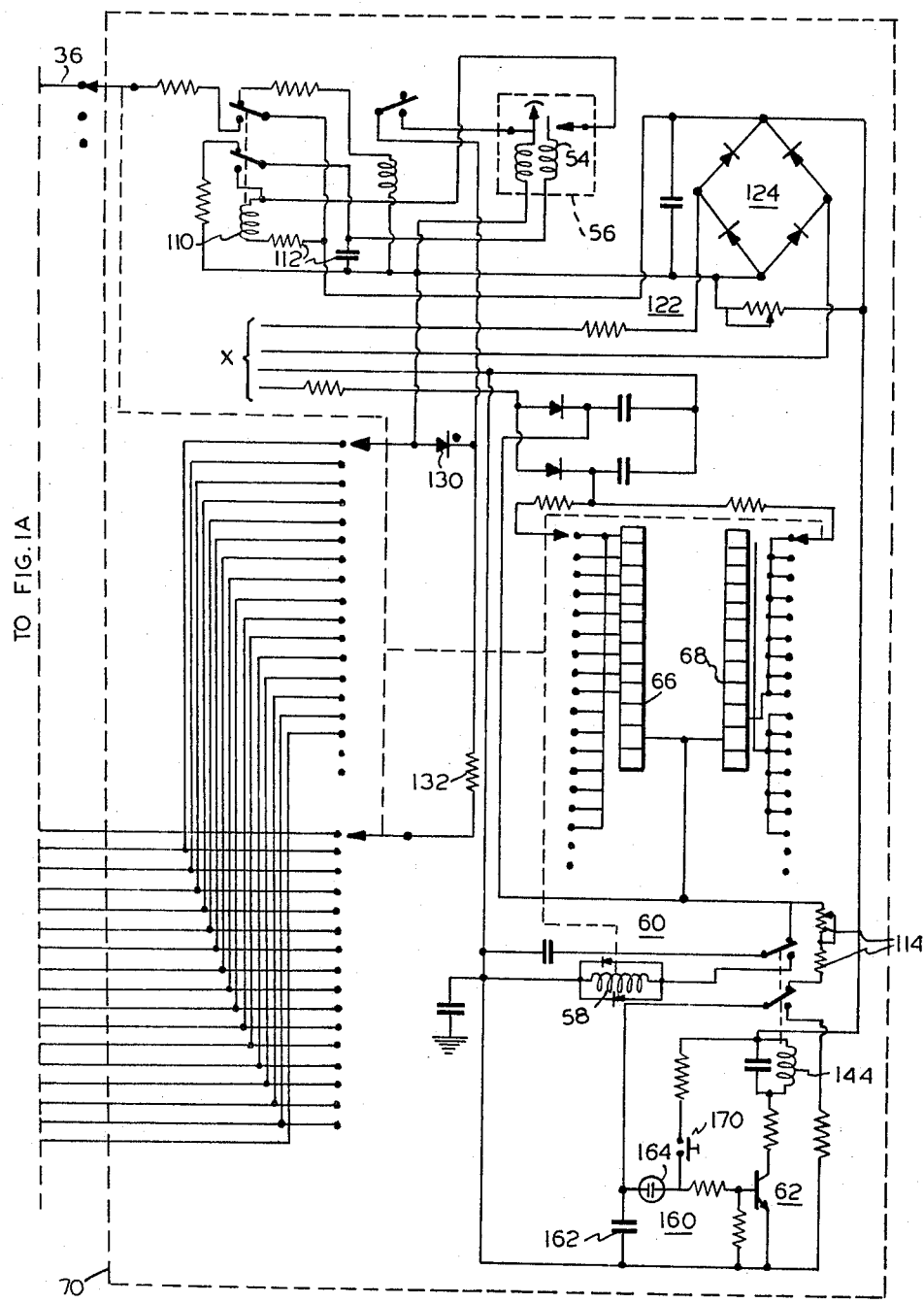

A complete understanding of the invention may be had from the following description of a particular embodiment of the invention. In the description, reference is made to the accompanying drawings of which:

FIGS. 1A and 1B constitute a schematic circuit diagram of the charging apparatus for multicell batteries in accordance with a preferred embodiment of the present invention;

FIG. 2 is a schematic circuit diagram of a voltage monitoring circuit shown in more exemplary form than that illustrated in FIGS. 1A and 1B; and FIG. 2A is a modified arrangement of the schematic circuit diagram in which a voltammeter is used to provide a circuit value indication, in which the circuit of FIG. 2 is modified by connecting at circuit point 2A—2A.

Referring now to the drawings, there are shown sixteen independently arranged modular constructed current controlled or regulating circuits 10, 11, 12, 13, 14, etc. to 25. These circuits may be constructed in housings forming the current regulating modules (not shown) that may be readily removed from the battery charger by releasing fasteners (not shown) on the front panel of a battery charger 26 and pulling the module straight out. Such connections are necessary to electrically connect the module to the battery charger and may be by printed circuit type connectors (not shown) at the rear of each module circuit. With the printed circuit connector, or other plug type arrangements, the module circuits through an impedance matching transformer 28 receive 10 volts A.C. center-tapped at 5 amps at taps 30, 32, 34, a disabling signal on conductor 36 and cell terminals 38, 40 for delivering current to the cell 42 of the battery 44. The impedance matching transformer 28 is used to provide reduction in weight as well as utility of translation of energy from 60 cycle to 400 cycle.

Each module circuit 10–24 supplies a current that substantially linearly tapers in value of voltage excursion from 5 to 4 amps and from 0 to 2.3 volts. The module circuits consist of regulating transistors 46, 48 and each module circuit is energized from a power source 45 having a common transformer primary winding and isolated secondary windings, so that the secondary windings supply current to the respective module circuits. In the module circuits are two pilot lamps 50, 52. The lamp 50 may be green and when it is ON indicates the current has completed the charging of the cell, while the lamp 52 which may be a clear or white lamp, when ON indicates that the module circuit is supplying current to its respective cell 42. At the time that the clear lamp is extinguished, in a manner to be described herebelow, it indicates that the module circuit has been disabled or de-energized with respect to charging the cell 42. The cell voltage is sampled approximately every three minutes with a high limit meter relay 54 (FIG. 1B) in a meter 56. When the meter reaches its preset limit, the module circuit which is charging its respective cell is locked out by a signal on conductor 36. The module circuit will remain locked out until the primary power to the battery charger is interrupted, as will be described below, and the battery cell connected thereto is disconnected at which time all of the module circuits will revert to a charge condition.

In general, it is noted that the voltage monitoring meter relay, which is more particularly illustrated in FIG. 2, is connected to each cell of the battery by means of a solenoid stepping switch 58 having at least five wafers and associated switching contacts. The switch 58 is actuated in step-by-step fashion for every 10 seconds by a modified relaxation oscillator 60 and a transistor amplifier 62, or until the cell is charged to its full value. The switch may be stepped manually to any cell to provide a visual indication of the cell voltage at any time during the charging period. This is provided by overriding the transistor amplifier 62 with switch 170. The meter 56 remains connected to the selected cell 42 for 10 seconds before automatically stepping to the next succeeding cell terminals 38, 40. The cell which the meter is monitoring is indicated on the front panel by illuminated numerals provided from a pair of digit Nixie tubes 66, 68. In one embodiment, the cells are numbered and the Nixie tubes indicate the corresponding numbering from 1 to 16 in a series string beginning with the positive end of the battery 44.

The maximum internal power dissipation of the battery charger in one embodiment is approximately 500 watts. This condition occurs when the output voltage of all of the modules is zero. The heat generated by this high power dissipation in a relatively small package or module is transferred to its environment by convection through the bottom and rear of the battery charger and monitoring circuit case, which is schematically illustrated as 70.

A transformer 72, a thermal cutout switch 74, and a power switch 76 may also be installed in the battery charger 26, and a case 70 may enclose the control system shown in FIG. 1B. The thermal cutout switch is located and connected to disable the primary circuit of the transformer 72, and thereby prevent circuit damage to the transistors of the battery charger and the module circuits. The thermal cutout switch may be adjusted to disconnect the primary power when the temperature in the case is 70° C. or more. This maximum temperature may be exceeded if the airflow through the bottom or rear of the case is impeded. The thermal cutout switch will automatically recover when the temperature decreases below the cutoff point, in any well-known manner of the prior art.

In the module circuit 10 there is shown a D.C. amplifier 80 with a degenerative current feedback circuit 82 which regulates the peak output current. The average current therefore decreases as the battery voltage increases in value. A sample of current as determined by the rotary switch is taken from resistor 86 of one of the modules 10–24, from which a signal is amplified by transistor 48, and is applied to the pass transistor 46 so that current is applied to the cell 42. The circuit is temperature stabilized by a thermistor element 90. Small adjustments in the output current may be made by adjustment of rheostat 92 which is otherwise pre-set at a given value.

The output current of the module circuit is stabilized for line voltage fluctuations by a negative voltage feedback applied to the base of transistor 48. As the line voltage increases, the increase in forward bias of transistor 48 is offset by an opposing bias through the zener diode 96. The collector current of transistor 48 is therefore independent of the line voltage variation which in effect stabilizes the entire module circuit voltage.

Relay 98 provides the lockout capability of the module circuit 10, mentioned above. A lockout signal is received from conductor 36, as will be described hereinbelow, which energizes the relay 98 which is locked in its energized position by holding contacts 100. The lockout relay 98 by contacts 101 also removes the forward bias from transistor 48 and shorts the base to emitter electrodes of transistor 46 causing the transistor 46 to be cut off. Relay 98 remains locked in until power is removed from the module circuit 10 and the battery 44 is disconnected. Interruption of the primary power to the charger and disconnecting the battery 44 therefore resets all of the module circuits which are locked out.

The green lamp 50, which may be mounted on a front panel of the module circuit, illuminates when the relay 98 is energized, and thereby indicates that the cell 42 is cut off from being charged. The clear or white indicator lamp 52, which may also be mounted on the front panel, is illuminated when a voltage is developed across resistance 86, indicating that the module circuit is supplying charging current to its related and selected cell 42.

Terminals 102 are test points located on the front panel (not shown) of each module circuit to allow measurement of the current being drawn by the corresponding or related and selected cell. The test point terminals are primarily for maintenance purposes, since the module circuits may be set up at the factory for the required current charge rate and should not deviate unless a component failure may develop.

The high current connections 38, 40 consist of two parallel contacts to increase reliability and minimize the connector resistance.

The potential of the current charging each cell 10–25 under charge is monitored intermittently by the voltage monitoring circuit in case 70, which is shown in more detail in FIG. 2. The charge current of the preferred embodiment is cut off when, for example, 2.10 volts is exceeded. The cell voltage is monitored by meter 54 which may be an expanded scale volt meter with a high limit contact, as schematically shown. When the voltage reaches the pre-set value, current flows through the relay section of the meter to energize relay 110. When the relay has been energized, the contacts of relay 110 connect a lock-out voltage to the module circuit which is charging or connected to its related and monitored cell. The closed contacts of relay 110 further cause the module circuit relay 98 to energize and remain energized due to its holding contacts 100. The relay 110 also causes the locking section of the meter to be shorted out and allowing the spring contact to return the indicator to its normal position. Relay 110 remains energized for approximately one second due to the time constant value of RC circuit 112 and the coil of relay 110. The meter relay of meter 54 will not repeat this cycle on the same cell 42 because of the potential decrease across the cell when the charging current has been caused to cease.

The cutoff circuit including relay 110 samples each cell by its potential as connected to sensing leads 38, 40 for a period of approximately, for example, 10 seconds. The time of the period may be adjustable by the value of resistance or rheostat 114 being appropriately adjusted. The rheostat 114 is in circuit with the time constant circuit 60. The cutoff circuit is switched to the cells by the respective circuit connections on the wafers of the rotary solenoid operated switch relay 58. The switch contains, as stated above, at least five 18-position wafers of which 16 positions are used in the present preferred embodiment. Three of the wafers are used to switch the meter relay and lock-out signal to the respective 16 different cells and current module circuits. At least the other two wafers of the switch relay 58 are used to operate Nixie tubes 66, 68 for indicating the cell being sampled, and the Nixie tubes are positioned to be observed from the front panel. Each position of the wafer, and therefore the corresponding cell being monitored, is indicated by the numerals which are illuminated on the tubes 66, 68.

The D.C. voltage required to operate relays 98 and 110 is obtained from a 30 volt power supply 122 consisting of silicon rectifier diodes 124, 124, 124, 124; and a 25 volt secondary winding 126 of the transformer 72.

The movement of the meter relay 54 is over-damped to prevent any overshoot which would cause an inaccurate cutoff. The response time of the meter is from one to two seconds. A Zener diode 130 and resistance 132 are provided to protect the meter 54 from over-voltage measurements which will occur if the battery is not connected.

The meter 54 measures the voltage at the cell terminals 38, 40 to insure minimum error. At the beginning of the charging cycle, the supply current is essentially a series charger, since only the two connecting wires across the entire battery draw current. As each cell reaches its terminal voltage, the supply breaks up into more than one series charger. Therefore, the voltage drive across the connecting wire to the battery varies since they may or may not be carrying current. If the cell voltages were measured in the charger rather than at the cell terminals, a definite error would be introduced.

The rotary stepping switch 58 is pulsed every 10 seconds by discharging condenser 142 through the solenoid with relay 144. Condenser 142 is charged to approximately 140 volts from the 115 volt secondary winding of the transformer 72 through rectifier 146, resistor 148 and contacts 150 of relay 144. Relay 144 is actuated by a modified relaxation oscillator 160 which controls the transistor amplifier 62. A capacitor 162 is charged through rheostat 114, and when the potential across capacitor 162 is sufficiently high in value, a neon lamp 164 conducts to cause transistor 62 to conduct also. The relay 144 is in the collector circuit of transistor 62 and is actuated when the neon lamp fires. The time during which the relay is generally energized is approximately 0.5 second, during which the capacitor 162 is discharged. This time interval is sufficient and essential in order to pulse the solenoid of relay 58 which is energized from contacts 150 of relay 144.

The relay 58 may be stepped manually by a single pole, single throw push-button type switch 170 at a maximum rate of approximately once per second. If switch 170 is held in a depressed position, relay 144 will remain closed and thereby prevent relay 58 from automatically stepping to its next position. Therefore, if it is desirable to monitor one particular cell for more than 10 seconds, switch 170 may be held in a depressed position for the required monitoring time.

When the battery charger is connected, as shown in the drawing, to charge a 16 cell battery 44, the clear indicator lamp on the front of each module circuit 10 will be energized and, if the push-button switch 170 is then depressed once every second until a complete sampling cycle has been completed, it will then be determined whether each cell of the battery is connected to its respective charging module. This constitutes a sampling cycle when the neon tube Nixie indicators on the front panel indicate the same numerals that were present at the start of the cycle. The clear indicator lamps remain illuminated throughout the first cycle. When all of the green indicator lamps are illuminated, it is indicative that the battery has a full charge and is ready for use.

In FIG. 2A is shown a simplified arrangement of circuit measure in which each cell is individually measured by the voltage of the cell being applied to a Schmitt trigger circuit 180 which applies a squarewave signal to a switch circuit 182 to relay the signal for measure by a meter 184.

Improved effects are found to be obtained in cell measurements of the charge when additional high conductive current paths are provided to connect the cell to the module circuits 10–25. In this manner, the current paths enable and provide highly sensitive measurements of small increments in voltage by reducing the voltage drop and by increasing the surface contact at the cell.

It should be understood that the specific apparatus schematically shown and illustrated herein and described above is intended to be representative only, as many changes may be made therein without departing from the clear teachings of the invention. Accordingly, reference should be made to the following claims in determining the full scope of the invention.

What is claimed is:

1. A charging circuit for a multicell battery comprising current regulating circuits connecting the cells of the multicell battery to a source of charging current, monitoring means for indicating the absence of a full charge of a cell and further for indicating a full charge condition of a cell, a stepping switch sequentially connecting said cells to said monitoring means, means responsive to said absence indicating means for maintaining said current regulating circuits conductive and said source of charging current thus locked in with their respective cells until a full charge is acquired by a cell, and means for periodically operating said stepping switch.

2. A charging apparatus as claimed in claim 1 and further comprising means in said current regulating circuits and responsive to said full charge indicating means for locking out said source of charging current to a cell when said cell attains a full charge condition.

3. A charging apparatus as claimed in claim 2 and further comprising relay holding means in said current regulating circuits for maintaining said source of charging current locked out from a fully charged cell until power is removed from said circuits and the battery disconnected from the charging apparatus.

4. A charging apparatus as claimed in claim 3 and further comprising means for interrupting said source of charging current to said current regulating circuits, said relay holding means maintaining said source locked out until said source of charging current is interrupted.

5. A charging apparatus as claimed in claim 1 with said switch operating means having a timing circuit for operating sequentially said stepping switch at predetermined intervals of time.

References Cited by the Examiner

UNITED STATES PATENTS

| 972,782 | 10/1910 | Entz | 320—15 |
| 2,635,221 | 4/1953 | Harvey | 320—19 |
| 2,988,694 | 6/1961 | Hessinger et al. | 324—98 X |
| 3,100,862 | 8/1963 | Collier | 320—48 X |

FOREIGN PATENTS

| 599,415 | 3/1948 | Great Britain. |

JOHN F. COUCH, *Primary Examiner.*

LLOYD McCOLLUM, *Examiner.*

S. WEINBERG, *Assistant Examiner.*